US006747211B2

(12) United States Patent
Connor et al.

(10) Patent No.: US 6,747,211 B2
(45) Date of Patent: Jun. 8, 2004

(54) ELECTRICAL COMPRESSION CONNECTOR

(75) Inventors: Brian W. Connor, Amherst, NH (US); Bejamin J. Michaud, Manchester, NH (US)

(73) Assignee: FCI USA, Inc., Etters, PA (US)

(*) Notice: Subject to any disclaimer, the term of this patent is extended or adjusted under 35 U.S.C. 154(b) by 0 days.

(21) Appl. No.: 09/902,034

(22) Filed: Jul. 10, 2001

(65) Prior Publication Data

US 2003/0010523 A1 Jan. 16, 2003

(51) Int. Cl.$^{7}$ .............................. H01R 4/00; H02G 3/06
(52) U.S. Cl. .................. 174/84 R; 174/84 C; 174/94 R
(58) Field of Search .............................. 174/84 R, 84 C, 174/90, 92, 94 R; 439/877, 878; 403/275, 391

(56) References Cited

U.S. PATENT DOCUMENTS

| | | | | | |
|---|---|---|---|---|---|
| 2,938,069 | A | * | 5/1960 | Toedtman et al. | 174/71 R |
| 2,956,108 | A | * | 10/1960 | Brenner | 174/71 R |
| 3,322,888 | A | * | 5/1967 | Zemels | 174/71 R |
| 3,354,517 | A | * | 11/1967 | Levinski | 174/71 R |
| 3,781,459 | A | * | 12/1973 | Peek | 174/71 R |
| 4,350,843 | A | * | 9/1982 | Campbell et al. | 174/84 C |
| 5,036,164 | A | * | 7/1991 | Schrader et al. | 174/7 |
| 5,103,068 | A | * | 4/1992 | Schrader | 174/71 R |
| 5,162,615 | A | * | 11/1992 | Schrader et al. | 174/71 R |
| 5,200,576 | A | * | 4/1993 | Schrader et al. | 174/71 R |
| 5,396,033 | A | * | 3/1995 | Piriz et al. | 174/71 R |
| 5,635,676 | A | * | 6/1997 | Piriz | 174/84 C |
| 5,898,131 | A | | 4/1999 | Chadbourne et al. | 174/84 C |
| 6,261,137 | B1 | * | 7/2001 | Wilcox | 174/84 C |

OTHER PUBLICATIONS

YH3429 Data Sheet, Burndy Electrical (FCI USA Inc), Dec. 19, 1990, Rev #9,.*

* cited by examiner

*Primary Examiner*—William H. Mayo, III
(74) *Attorney, Agent, or Firm*—Harrington & Smith, LLP

(57) ABSTRACT

An electrical compression connector including a first section having a first conductor receiving channel extending into a top side of the connector; and a second section integrally formed with the first section. The second section has a second and a third conductor receiving channel extending into opposite respective second and third lateral sides of the connector. The second conductor receiving channel has opposing concave surfaces having different shapes.

26 Claims, 5 Drawing Sheets

ELECTRICAL COMPRESSION CONNECTOR

BACKGROUND OF THE INVENTION

1. Field of the Invention

The present invention relates to electrical connectors and, more particularly, to an electrical compression connector.

2. Brief Description of Prior Developments

U.S. Pat. No. 5,898,131 discloses a twisted H-shaped electrical connector. A hydraulic compression tool can be used to compress the connector for connecting two conductors to each other at the same time. FCI USA Inc. sells electrical compression connectors under the part designation YH3429C which are specifically designed for the telecommunications industry for making parallel and tap connections to copper Class I and Class K stranded conductors.

Class K conductors are more flexible than Class I conductors. This increased flexibility is provided by a substantially larger number of individual strands in the conductor. For example, a 250 kcmil Class I copper stranded conductor has 637 strands and a 250 kcmil Class K copper stranded conductor has 2499 strands. The individual strands of a Class K conductor have a smaller diameter than the individual strands in a Class I conductor (0.01 inch versus 0.201 inch). However, a Class K conductor has a larger outer diameter than a Class I conductor of the same electrical size.

For the YH3429C connector, the largest tap conductor receiving channel can accept and be properly crimped onto a Class I conductor between 250 kcmil-1/0 AWG or a Class K conductor between 3/0 and 1/0 AWG. The YH3429C connector cannot be properly crimped onto a 4/0 AWG Class K conductor at its largest tap conductor receiving channel. The largest tap conductor receiving channel is too small to properly receive and connect to the larger diameter Class K conductor. Although a 4/0 AWG Class K conductor might be placed inside the largest tap conductor receiving channel of the conventional YH3429C compression connector, during compression strands of the Class K conductor are pushed out of the lateral side aperture of the tap conductor receiving channel before the aperture is closed. This creates a problem electrically due to the small percentage of strands actually contained in the compressed conductor tap receiving channel. These non-contained stands can also contact and thereby cause problems with nearby electrical or electronic components. In addition, these strands can break off of the conductor and cause additional problems with nearby electrical or electronic components. Similar problems occur with the other two tap channels in the YH3429C connector.

There is a desire to provide an electrical compression connector with tap conductor receiving channels which can be used with Class I and Class K conductors having the same electrical wire size. There is also a desire to provide an electrical compression connector adapted to be connected to a Class I conductor or a Class K conductor of the same size and can be compressed onto the Class K conductor without strands of the conductor being pushed out of a lateral side aperture into the tap conductor receiving area before the aperture is closed.

SUMMARY OF THE INVENTION

In accordance with one embodiment of the present invention, an electrical compression connector is provided including a first section having a first conductor receiving channel extending into a top side of the connector; and a second section integrally formed with the first section. The second section has a second and a third conductor receiving channel extending into opposite respective second and third lateral sides of the connector. The second conductor receiving channel has opposing concave surfaces having different shapes.

In accordance with another embodiment of the present invention, an electrical compression connector and electrical conductor assembly is provided having an extruded electrical compression connector comprising a first generally U-shaped section forming a first conductor receiving channel, and a second section integrally formed with the first section. The second section has a second conductor receiving channel with opposing first and second curved conductor contact surfaces each having a different radius of curvature. The second section has a bottom cantilevered curved leg forming the second contact surface. The assembly further includes a class K electrical conductor located in the second conductor receiving channel. When the connector is compressed onto the conductor, the leg is deformed towards the first contact surface.

In accordance with one method of the present invention, a method of manufacturing an electrical compression connector is provided comprising steps of extruding a metal member through an extrusion die; forming the metal member during the step of extruding with a first section having a main conductor receiving channel; forming the metal member during the step of the extruding with a second section having a first tap conductor receiving channel and a second tap conductor receiving channel. The first tap conductor receiving channel is formed with opposing concave surfaces each having a different radius of curvature.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
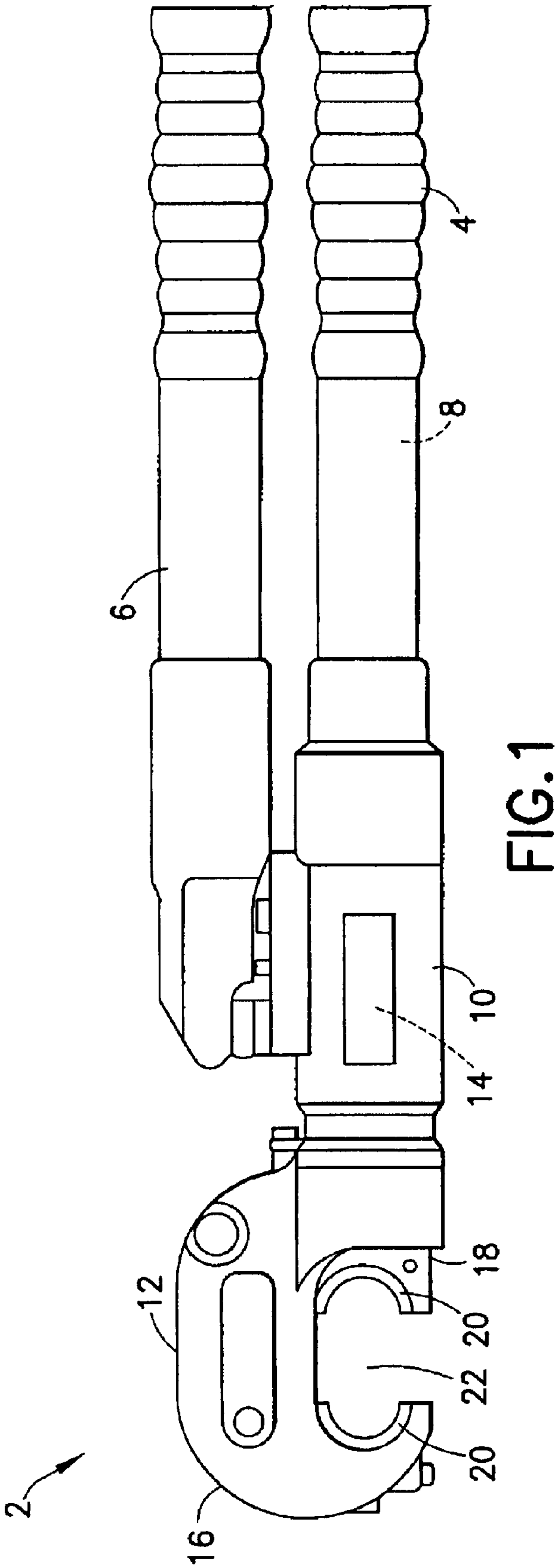
FIG. 1 PRIOR ART
FIG. 1 is an elevational side view of a conventional hydraulic hand operated connector compression tool.

Referring to FIG. 1, there shown an elevational side view of a conventional hydraulic tool 2 used to compress electrical compression connectors onto electrical conductors. One such tool is sold by FCI USA Inc. under the part designation Y750. However, the electrical connector of the present invention could be compressed onto electrical conductors by any suitable type of compression tool. For example, another such tool is sold by FCI USA Inc. under the part designation Y46.

The tool 2 shown in FIG. 1 generally comprises a first handle 4 having a fluid reservoir 8 therein, a second handle 6, a body 10 and a compression head 12. A hydraulic pump 14 is located inside the body 10. The compression head 12 generally comprises a frame 16 and a movable ram 18. The ram 18 is moved forward on the frame 16 by hydraulic pressure from hydraulic fluid delivered from the pump 14. The frame 16 and the ram 18 are each adapted to removably receive a crimping die 20. A connector receiving space 22 is formed between the two crimping dies 20. When the ram is advanced to move the two dies 20 towards each other, a connector located between the two dies is compressed or crimped.

Figure 2:
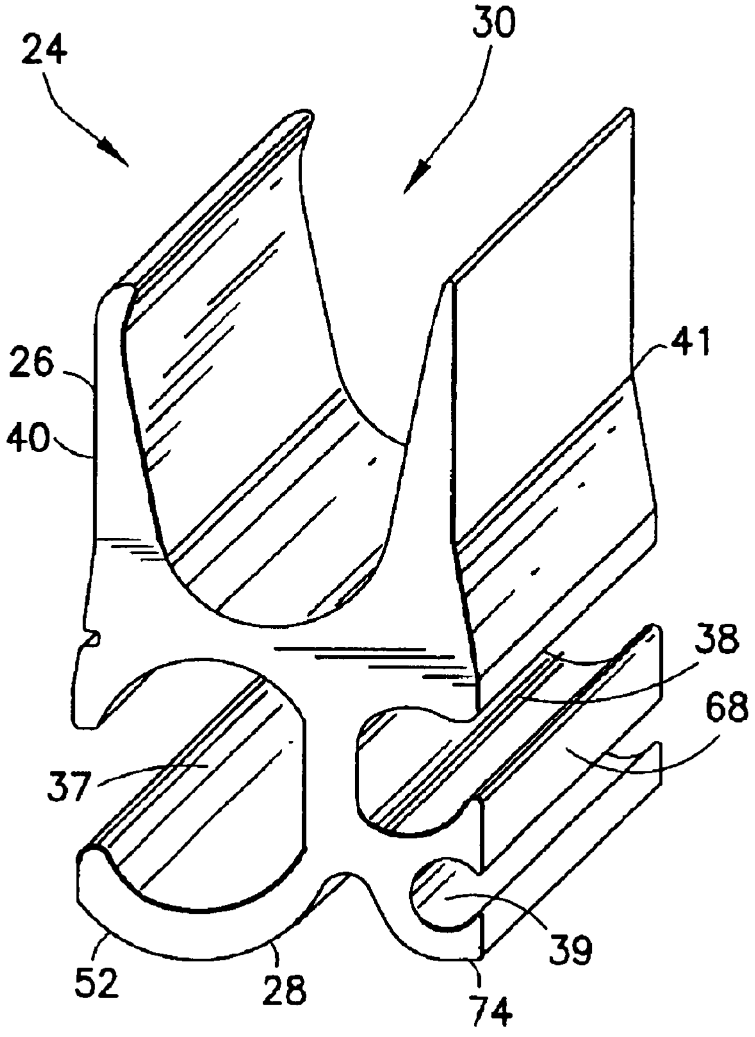
FIG. 2 is a perspective view of an electrical compression connector incorporating features of the present invention.
Figure 3:
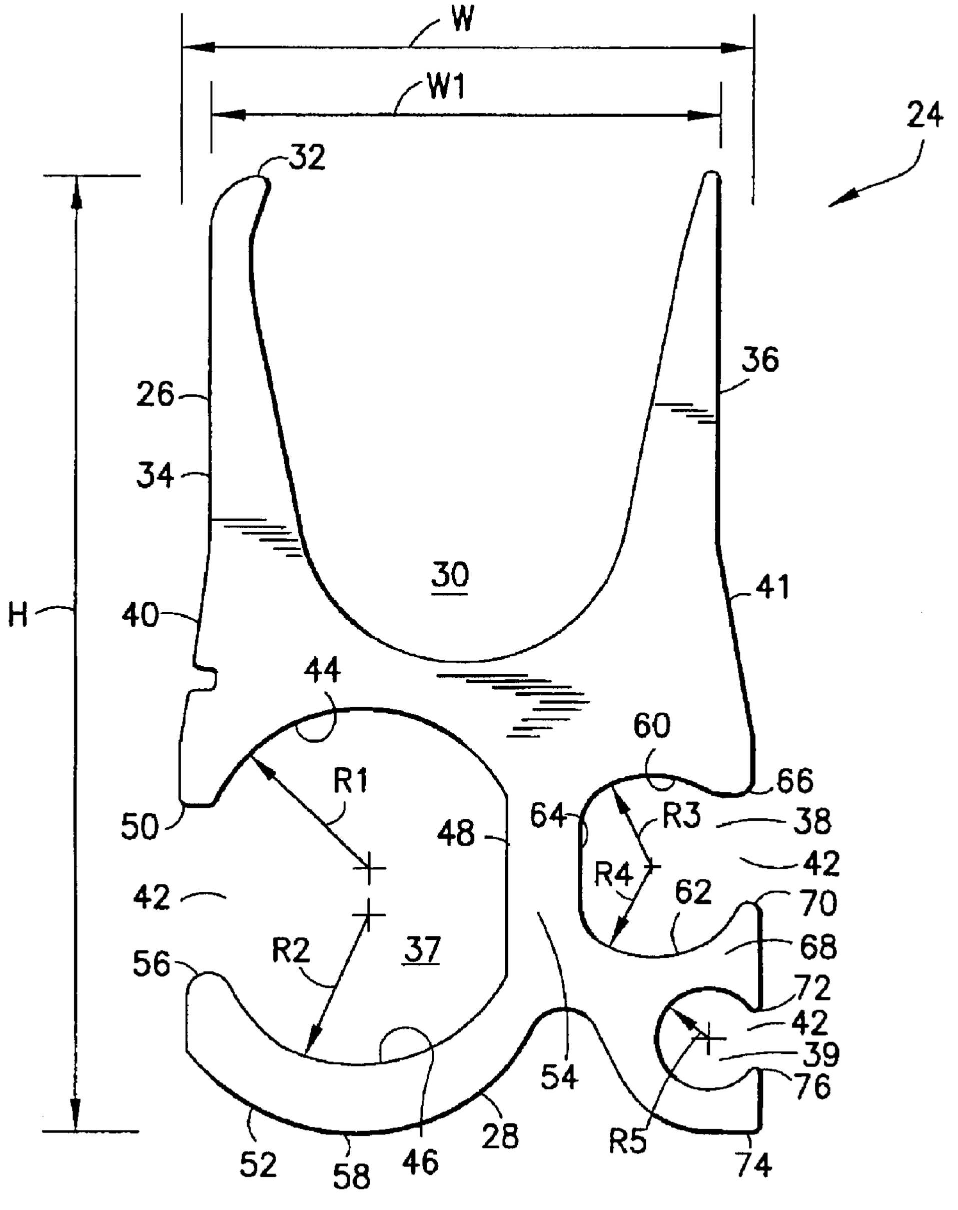
FIG. 3 is a front elevational view of the connector shown in FIG. 2.

Referring to FIGS. 2 and 3, there are shown a perspective view and a front elevational view of an electrical compression connector 24 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

The connector 24 comprises a one-piece member. The one-piece member is preferably comprised of metal, such as copper. However, the one-piece member could be comprised of multiple components and/or could be comprised of any suitable materials, such as aluminum. The one-piece member is preferably an extruded member. However, any suitable type of method for manufacturing the one-piece member could be provided.

The connector 24 generally comprises a first section 26 and a second section 28. In this embodiment, the first section 26 is a top section of the connector and the second section 28 is a bottom section of the connector. The two sections 26,28 are preferably integrally formed with each other during the extrusion process. Because the connector 24 is preferably manufactured by an extrusion process, the connector has a substantially uniform cross-section along its length. However, in alternate embodiments, the connector 24 could have sections along its length which do not have a uniform cross-section.

The top section 26 has a first conductor receiving channel 30 extending into a first top side 32 of the connector. The top section 26 has a general U-shaped profile. A first leg 34 has a curved top end. A second leg 36 has a relatively tapered or pointed top end. However, in alternate embodiments, the top section 26 and the legs 34, 36 could have any suitable type of shape.

The bottom section 28 has a second conductor receiving channel 37, a third conductor receiving channel 38, and a fourth conductor receiving channel 39. The second, third and fourth conductor receiving channels form tap conductor receiving channels. The four conductor receiving channels 30, 37, 38 and 39 extend generally parallel to each other. In alternate embodiments more or less than three tap conductor receiving channels could be provided in the second section 28. The first tap channel 37 extends into a first lateral side 40 of the connector. The other two tap channels 38, 39 extend into an opposite second lateral side 41 of the connector. Each tap conductor channel in the second section has an aperture 42 at its respective lateral side 40,41.

In a preferred embodiment, the connector 24 has a height H which is about 2.23 inches, and a width W at the top section 26 between the lateral sides 40,41 which is about 1.15 inches. However, in alternate embodiments, the connector could have any suitable height and width. These dimensions (H and W) and the shape of the top section 26 are substantially the same as an existing conventional electrical compression connector sold by FCI USA Inc. under the part designation YH3429C.

The connector 24 differs from the YH3429C compression connector in two main respects. First, the first and second tap conductor channels 37, 38 have a larger size than in the conventional connector. Second, the shape of the first and second tap conductor receiving channels 37, 38 are different. The combination of these two features provide a new and improved electrical compression connector which has numerous advantages.

The conventional YH3429C electrical compression connector is adapted to connect to Class I copper stranded conductor with a main run wire size (in its main conductor receiving area) between 500 kcmil-4/0 AWG, and a largest tap wire size between 250 kcmil-1/0 AWG. The connector 24 is sized and shaped to connect to the same range of Class I copper conductors as the conventional YH3429C electrical compression connector. However, the connector 24 is also sized and shaped to connect to the same range electrical sizes of the larger outer diameter Class K stranded conductors.

When the conventional YH3429C electrical compression connector was attempted to be connected to a 4/0 AWG Class K stranded conductor in its largest tap channel, during crimping strands of the 4/0 AWG Class K conductor are pushed out of the tap channels and were not completely captured in the tap channel. The same thing could occur with the second tap channel and a 1 AWG Class K conductor. This caused problems as noted above. The present invention overcomes these problems. The present invention allows all the strands of the 4/0 AWG Class K conductor to be retained in the first tap channel 37 during compression of the connector 24. This feature is provided by the combination of the increased size of the first tap channel 37 and the shape of the second section 28. The present invention allows all the strands of the 1 AWG Class K conductor to be retained in the second tap channel 38 during compression of the connector 24. This feature is provided by the increased size and shape of the second tap channel 38.

At the junction of the first and second sections 26, 28 the connector flares outward such that the second section 28 has a larger width W1. In a preferred embodiment, W1 is about 1.3 inches. However, any suitable width could be provided. The first tap channel 37 has a top surface 44, a bottom surface 46, and a side surface 48 connected between the top and bottom surfaces. The top surface 44 is part of an outer downward projection 50 at the lateral side 40. The top surface 44 has a concave curved shape with a radius of curvature R1. In a preferred embodiment the radius of curvature R1 is about 0.4 inch. However, in alternate embodiments, the radius of curvature R1 could have any suitable length. In another alternate embodiment, the top surface 44 could have any suitable type of shape, so long as the surface has a general concave shape.

The bottom surface 46 is comprised of a top surface of a bottom cantilevered leg 52. The leg 52 extends from the bottom of a center section 54 in a general laterally outward direction. In this embodiment, the leg 52 has a general curved finger shape. However, the leg 52 could have any suitable type of shape. Because of the general curved finger shape, the leg 52 extends downward from the center section 54 and then curves upward towards the projection 50. A tip 56 of the leg 52 is located generally opposite the projection 50 with the aperture 42 therebetween. The bottom surface 58 of the leg 52 is also generally curved and, in this embodiment, is substantially parallel to the surface 46. The bottom surface 46 has a concave curved shape with a radius of curvature R2. In a preferred embodiment the radius of curvature R2 is about 0.31 inch. However, in alternate embodiments, the radius of curvature R2 could have any suitable length. In another alternate embodiment, the bottom surface 46 could have any suitable type of shape, so long as the surface as a general concave shape.

The side surface 48 has a general flat shape. However, in alternate embodiments, the side surface 48 could have any suitable type of shape. The side surface 48 extends along a side of the center section 54. The side surface 48 is located generally opposite the aperture 42 into the first tap receiving channel 37.

The second tap channel 38 has a top surface 60, a bottom surface 62, and a side surface 64 connected between the top and bottom surfaces. The top surface 60 is part of an outer downward projection 66 at the lateral side 41. The top surface 60 has a concave curved shape with a radius of curvature R3. In a preferred embodiment the radius of curvature R3 is about 0.215 inch. However, in alternate embodiments, the radius of curvature R3 could have any suitable length. In another alternate embodiment, the top surface 60 could have any suitable type of shape, so long as the surface has a general concave shape.

The bottom surface 62 is part of a lateral projection or leg 68. The lateral projection 68 has a top projection 70 and a bottom projection 72. The top projection 70 extends upward generally towards the projection 66 at the lateral 41 the aperture 42 into the second tap channel 38 therebetween. The bottom surface 62 has a concave curved shape with a radius of curvature R4. In a preferred embodiment the radius of curvature R4 is about 0.215 inch. However, in alternate embodiments, the radius of curvature R4 could have any suitable length. In another alternate embodiment, the bottom surface 62 could have any suitable type of shape, so long as the surface has a general concave shape.

The side surface 64 has a general flat shape. However, in alternate embodiments, the side surface 64 could have any suitable type of shape. The side surface 64 extends along a side of the center section 54. The side surface 64 is located generally opposite the aperture 42 into the second tap receiving channel 38.

The third tap channel 39 is generally defined by the lateral projection 68 and a bottom leg 74. The bottom leg 74 curves downward from the projection 68 and laterally outward towards the lateral side 41. In this embodiment, the channel 39 has a general circular shape except at the aperture 42. The channel 39 has a radius of curvature R5. In a preferred embodiment the radius of curvature R5 is about 0.157 inch. However, in alternate embodiments, the radius of curvature R5 could have any suitable length. The third tap channel 39 is located generally below the second tap channel 38. An end of the leg 74 has an upward projection 76 located opposite the downward projection 72 with the aperture 42 of the third tap channel 39 therebetween.

Figure 4:
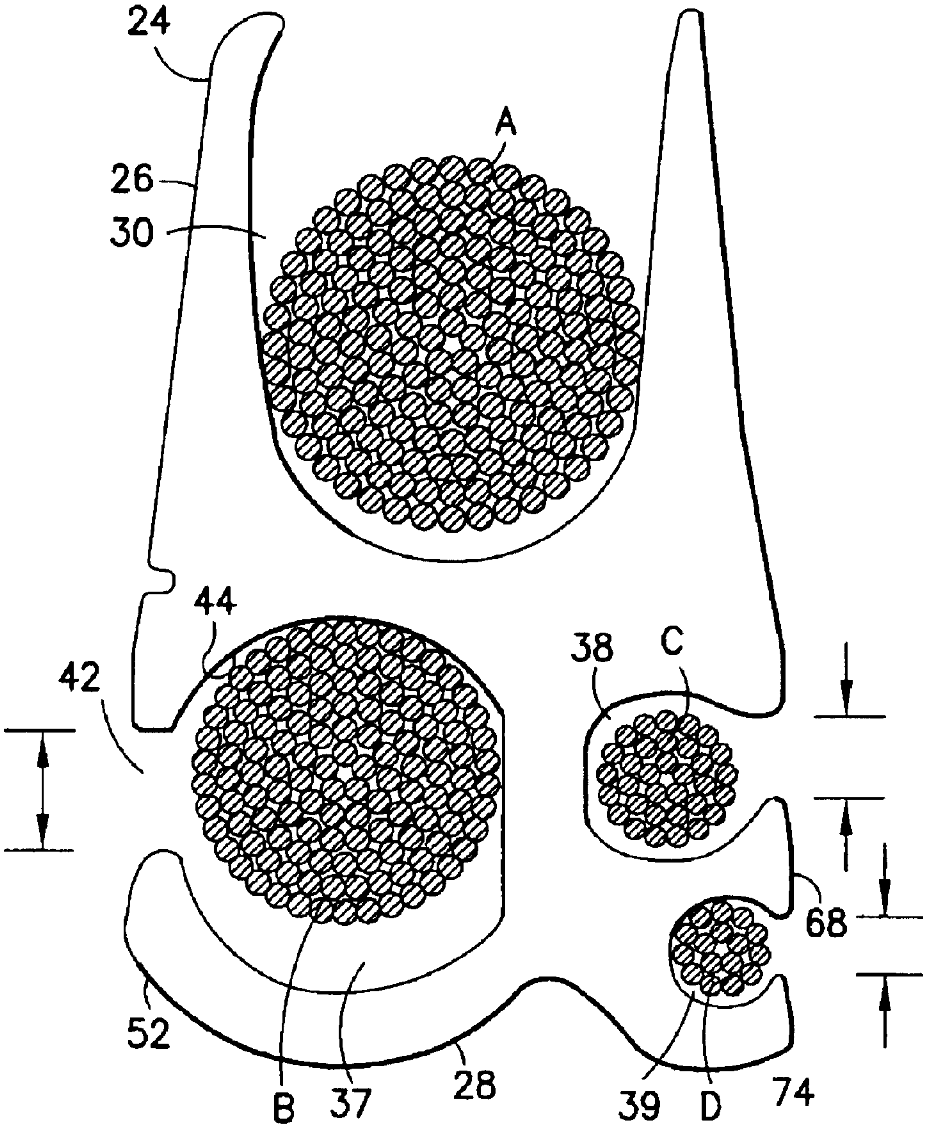
FIG. 4 is a front elevational view of the connector shown in FIG. 3 and four conductors with the connector partially crimped onto the conductors.

Referring also to FIG. 4, the connector 24 is shown at a partially crimped condition onto a main conductor A and three tap conductors B, C and D. One of the features of the present invention is in regard to the early closure of the side aperture 42 into the first tap channel 37. The connector 24 was designed to accept relatively large flex Class K conductors in two tap locations 37,38. With the conventional YH3429C connector, it is not possible to contain all of the strands of a 4/0 Class K conductor in the first tap channel or a 1 AWG Class K conductor in the second tap channel. The connector 24 uses a unique multi-radius design in the tap channel 37 and an expanded volume in the tap channel 38 to allow Class K conductors to be located and properly completely crimped in these channels.

The design of the tap channel 37 still allows the connector to be formed by an extrusion process without having sections between the tap channels being formed too thin. In addition, the connector 24 has sufficient material such that, even though the connector has less material than the conventional YH3429C connector, it still does not cause performance problems electrically. The design of the connector 24 allows the tap channel 37 to start to close at the start of the closure of the main run channel 30; the closure of the tap channel 37 having a head start over the closure of the other two remaining tap channels 38 and 39. The increased radius of curvature at the top surface 44 of the first tap channel 37 allows the flex conductor B a place or location to move into rather than trying to spray out the opening 42 of the channel 37.

With the present invention, during the compression or crimping process, the legs 52, 68 and 74 are deformed upward to contact the respective opposite downward projections 50, 66 and 72. This closes the lateral side apertures 42 into the tap channels 37, 38 and 39. The deformation of the legs 52, 68 and 74, to close the lateral side apertures 42, is completed before substantial compression of the main conductor A in the top section 26 occurs. In other words, the closing of the lateral side apertures 42 occurs at an early stage during the connector compression process. This early stage closing of the lateral side apertures 42 prevents strands of the Class K conductor from exiting the apertures 42 during the start of crimping. This is because the apertures 42 are closed before the Class K tap conductors B, C and D in the tap channels 38-39 are exposed to substantial compression. Therefore, compressive forces acting upon the tap conductors B-D before the apertures 42 close are insufficient to force strands of the tap conductors B-D out of the apertures 42. With the apertures 42 closed, the connector 24 can continue to be compressed to fully crimp the connector on the conductors A-D. Thus, the connector 24 can be used to connect to both Class I and Class K stranded conductors.

Figure 5:
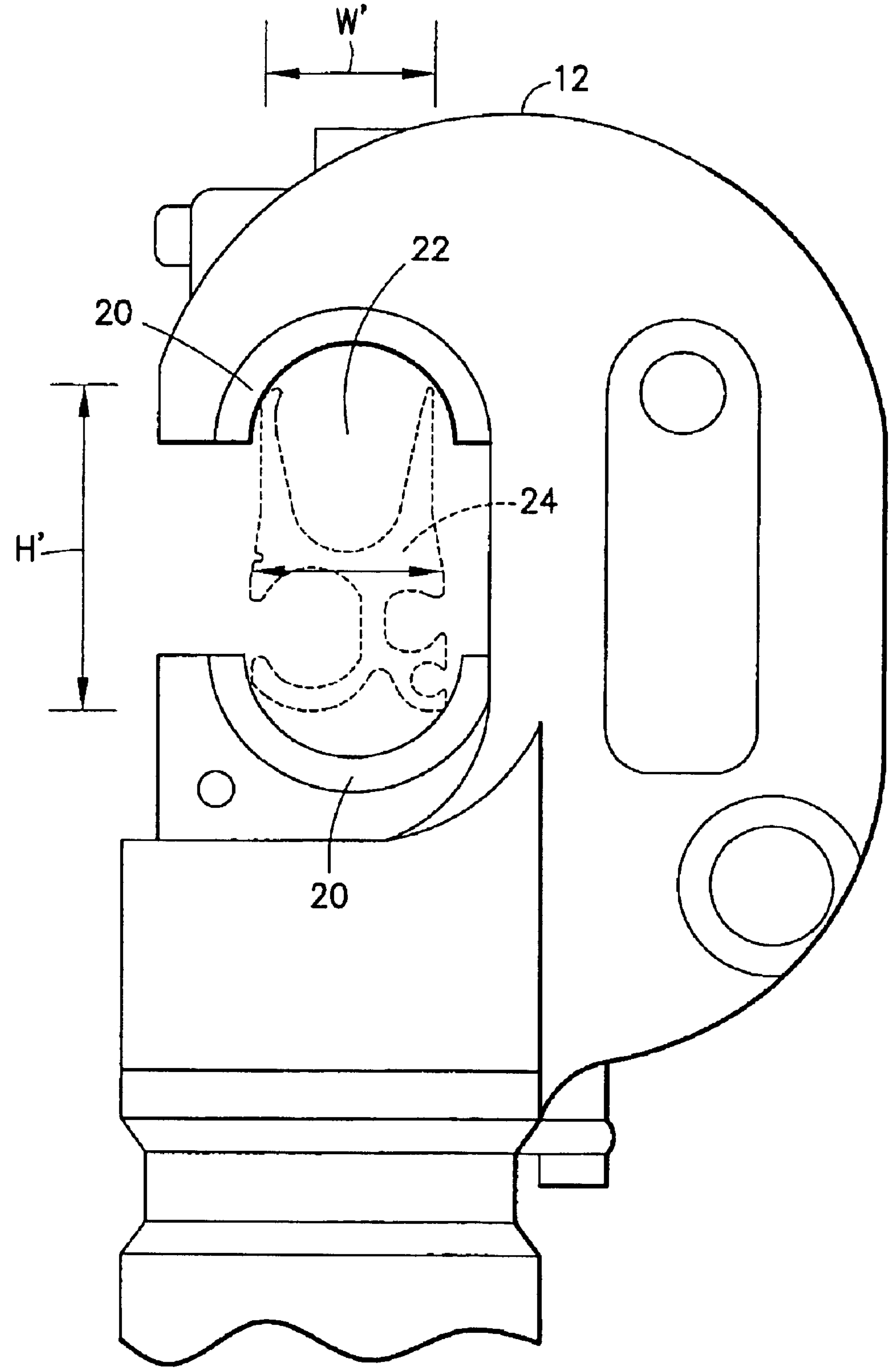
FIG. 5 is an enlarged elevational view of the crimping head of the tool shown in FIG. 1 with the connector shown in dotted lines.

Referring also to FIG. 5, another feature of the present invention will be described. As noted above, the dimensions H and W are preferably substantially the same as the conventional YH3429C electrical compression connector. The YH3429C connector is compressed or crimped by use of specific types of dies 20 in the tool 2, such as U dies or P dies sold by FCI USA Inc (more specifically U1104 dies in the Y750 tool and P1104 dies in the Y46 tool). There is a desire to allow Class K conductors to be connected by a compression connector, similar to the YH3429C connector, which can use the same tool (such as a Y46 or Y750 tool) and the same dies (such as U1104 dies or P1104 dies) as have been used in the past to crimp the YH3429C connector. However, the connector receiving area 22 between the dies 20 has a limited space. This presents a height H' and width W' limitation for any type of new connector if the same tool and dies are desired to be used. Thus, the overall size of the new connector could not merely be increased. If the new connector was too big, it could not fit within the connector receiving area 22. In addition, the body of the connector must comprise sufficient material and sufficient dimensions to prevent failure of the connector during crimping or compression.

The connector 24 has been specifically designed to be usable with the same tool and dies as were used in the past to crimp the YH3429C connector. Therefore, users do not need to buy a new tool or new dies. The same tool and dies used to crimped the YH3429C connector can be used to crimp the connector 24 onto either Class I or Class K conductors. Although the sizes of the tap channels 37 and 38 have been increased compared to the conventional YH3429C connector, because of the cooperating nature of the shape of the legs 52, 68 and 74, the increase in size of the tap channels 37-38 and has been minimized. Thus, the body of the connector has sufficient material and sufficient dimensions to prevent failure of the connector during crimping and still provide adequate electrical properties.

Increasing the size of the tap channels alone, without also providing the shape of the legs 52, 68 and 74, could have resulted in a connector without sufficient material or dimensions to prevent failure during crimping. The shape of the legs 52, 68 and 74 also help to minimize the increase in size of the overall connector, but still allow quick closure of the lateral side apertures 42 at the two tap channels 37 and 38; which are now also able to receive larger class K conductors than in the prior art connector.

The combination of the increased size tap channel 38 and the multi-radius channel 37 produces an additive affect. These features combine to allow the connector 24 to be connected to two tap class K conductors and close the lateral side apertures to the tap channels before compression forces on the tap conductors attempt to push the tap conductors out of the lateral side apertures, but nonetheless allows the connector to have sufficient material and rigidity to withstand the crimping action of the crimping tool without a failure of the connector.

The new design is easy to manufacture as an extrusion. The new design is capable of containing all the strands of highly flexible conductor in the two tap locations. The new design has a greater conductor range. In the past, there was no available conventional tap connector that was capable of containing two highly flexible class K conductors. The connector 24 also uses less material during manufacturing. This results in a cost savings during manufacturing. Samples of the connector 24 were made and tested. The test results showed that the new design contains all the strands of a 4/0 AWG flex Class K conductor in tap channel 37 and an 8 AWG flex Class K conductor in tap channel 38.

The compression tool 2 crimps the top and bottom sections 26,28 onto the four conductors A–D at substantially a same time. Although the legs 52, 68 and 74 are deformed to close the lateral side apertures 42 at an early stage of the connector's crimping, the tips 56, 70, 76 contact the projections 50, 66 and 72. This temporarily stops or slows down further significant compression of the bottom section 28 until more significant deformation of the top section 26 occurs. The legs 34, 36 are crimped inward and downward towards the conductor A, and then the connector 24 is relatively evenly compressed onto the four conductors A-D. This prevents the connector 24 from piercing too deeply into the tap conductors B, C and D and potentially creating a bad crimp.

The connector 24 is particularly useful in the telecommunications industry for distribution of power by use of Class K conductors. The connector 24 can receive either a Class I or a Class K conductor in main run channel 30 and, can receive either a Class I and/or a Class K conductor in each of the respective tap conductor channels.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An electrical compression connector comprising:

a first section having a first conductor receiving channel extending into a top side of the connector; and a second section integrally formed with the first section, the second section having a second and a third conductor receiving channel extending into opposite respective first and second lateral sides of the connector, wherein the second conductor receiving channel comprises opposing concave surfaces having different shapes, wherein a first one of the concave surfaces is located closer to the first conductor receiving channel than a second one of the concave surfaces, wherein the first concave surface has a larger radius of curvature than a radius of curvature of the second concave surface, and wherein the third conductor receiving channel comprises opposing concave surfaces and a side surface between the opposing concave surfaces having a substantially flat shape.

2. An electrical compression connector as in claim 1 wherein the second section further comprises a fourth conductor receiving channel extending into the second lateral side of the connector, wherein the fourth conductor receiving channel is located below the third conductor receiving channel, and wherein the fourth conductor receiving channel comprises curved top, bottom and side surfaces having a same radius of curvature.

3. An electrical compression connector as in claim 1 wherein the second conductor receiving channel comprises a substantially flat side between the first and second concave surfaces.

4. An electrical compression connector as in claim 1 wherein the flat side surface of the second conductor receiving channel extends more than a third of a total height of the second conductor receiving channel.

5. An electrical compression connector comprising:

a first section having a first conductor receiving channel extending into a top side of the connector; and a second section integrally formed with the first section, the second section having a second and a third conductor receiving channel extending into opposite respective first and second lateral sides of the connector, wherein the second conductor receiving channel comprises opposing concave surfaces having different shapes, wherein a first one of the concave surfaces has a first radius of curvature and a second one of the concave surfaces has a second different radius of curvature, and wherein the second radius of curvature is at least about 25% smaller than the first radius of curvature.

6. An electrical compression connector as in claim 5 wherein the first section comprises a general U-shape.

7. An electrical compression connector as in claim 5 wherein the first and second sections are integrally formed as an extruded member.

8. An electrical compression connector as in claim 5 wherein the first, second and third conductor receiving channels extend generally parallel to each other.

9. An electrical compression connector as in claim 5 wherein the second section comprises a curved cantilevered leg with a top surface forming a second one of the concave surfaces.

10. An electrical compression connector as in claim 9 wherein an aperture is provided between a tip of the cantilevered leg and an opposing surface at the first lateral side, and wherein an aperture is provided through the second lateral side into the third conductor receiving channel.

11. An electrical compression connector as in claim 5 wherein the second section further comprises a fourth conductor receiving channel extending into the second lateral side of the connector.

12. An electrical compression connector as in claim 11 wherein the second section comprises a curved cantilevered leg having a top surface which forms a portion of the fourth conductor receiving channel.

13. An electrical compression connector as in claim 5 wherein the third conductor receiving channel comprises opposing concave surfaces having a same shape.

14. An electrical compression connector as in claim 5 wherein the second conductor receiving channel comprises a side surface between the opposing concave surfaces having a substantially flat shape.

15. An electrical compression connector and electrical conductor assembly comprising:

an extruded electrical compression connector comprising a first generally U-shaped section forming a first conductor receiving channel, and a second section integrally formed with the first section, the second section comprising a second conductor receiving channel with opposing first and second curved conductor contact surfaces each having a different radius of curvature, the second section having a bottom cantilevered curved leg forming the second contact surface; and a class K electrical conductor located in the second conductor receiving channel, wherein, when the connector is compressed onto the conductor, the leg is deformed towards the first contact surface, and wherein a second one of the radii of curvature is at least about 25% smaller than a first one of the radii of curvature.

16. An electrical compression connector as in claim 15 wherein the second section comprises a third conductor receiving channel on an opposite side of the second conductor receiving channel, the third conductor receiving channel having a smaller size than the second conductor receiving channel.

17. An electrical compression connector as in claim 16 wherein the second section comprises a fourth conductor receiving channel on the opposite side of the second conductor receiving channel and located below the third conductor receiving channel, the fourth conductor receiving channel having a smaller size than the third conductor receiving channel.

18. An electrical compression connector as in claim 15 wherein the second section comprises a curved cantilevered leg with a top surface forming a second one of the contact surfaces having the second radii of curvature.

19. An electrical compression connector and electrical conductor assembly comprising:

an extruded electrical compression connector comprising a first generally U-shaped section forming a first conductor receiving channel, and a second section integrally formed with the first section, the second section comprising a second conductor receiving channel with opposing first and second curved conductor contact surfaces each having a different radius of curvature, the second section having a bottom cantilevered curved leg forming the second contact surface, wherein the radius of curvature of the second curved conductor contact surface is smaller than the radius of curvature of the first curved conductor contact surface; and a class K electrical conductor located in the second conductor receiving channel, wherein, when the connector is compressed onto the conductor, the leg is deformed towards the first contact surface, wherein the second conductor receiving channel comprises a side surface between the opposing conductor contact surfaces having a substantially flat shape, and wherein the second section further comprises a third conductor receiving channel having opposing concave surfaces and a side surface between the opposing concave surfaces with a substantially flat shape.

20. An electrical compression connector comprising:

a first section having a first conductor receiving channel extending into a top side of the connector; and a second section integrally formed with the first section, the second section having a second and a third conductor receiving channel extending into opposite respective first and second lateral sides of the connector, wherein the second conductor receiving channel comprises opposing concave surfaces having different shapes, wherein a radius of curvature of second one of the concave surfaces located at a bottom of the second conductor receiving channel is smaller than a radius of curvature of a first one of the concave surfaces, and a side surface between the opposing concave surfaces.

21. An electrical compression connector as in claim 20 wherein a first one of the concave surfaces has a first radius of curvature and a second one of the concave surfaces has a second different radius of curvature, and wherein the second radius of curvature is at least about 25% smaller than the first radius of curvature.

22. An electrical compression connector as in claim 20 wherein the second section comprises a width which is larger than a width of the first section.

23. An electrical compression connector as in claim 20 wherein the opposing concave surfaces have about a same width.

24. An electrical compression connector as in claim 20 wherein a top one of the opposing surfaces comprises an outer downward extending projection and a bottom one of the opposing surfaces comprises an outer upward extending tip, and wherein the projection and tip are located opposite each other.

25. An electrical compression connector as in claim 20 wherein the flat side surface extends more than a third of a total height of the second conductor receiving channel.

26. An electrical compression connector as in claim 20 wherein the third conductor receiving channel comprises opposing concave surfaces and a side surface between the opposing concave surfaces having a substantially flat shape.

* * * * *

UNITED STATES PATENT AND TRADEMARK OFFICE

CERTIFICATE OF CORRECTION

PATENT NO. : 6,747,211 B2
DATED : June 8, 2004
INVENTOR(S) : Connor et al.

It is certified that error appears in the above-identified patent and that said Letters Patent is hereby corrected as shown below:

Column 10,
Line 32, claim 20 should end with -- comprises a substantially flat shape. --

Signed and Sealed this

Twenty-first Day of December, 2004

JON W. DUDAS
*Director of the United States Patent and Trademark Office*